(12) United States Patent
Middleton

(10) Patent No.: US 11,583,140 B1
(45) Date of Patent: Feb. 21, 2023

(54) THERMOMETER DEVICE FOR A SMOKER

(71) Applicant: Jim Middleton, Ewing, VA (US)

(72) Inventor: Jim Middleton, Ewing, VA (US)

( * ) Notice: Subject to any disclaimer, the term of this patent is extended or adjusted under 35 U.S.C. 154(b) by 594 days.

(21) Appl. No.: 16/688,325

(22) Filed: Nov. 19, 2019

(51) Int. Cl.
A47J 37/07 (2006.01)
G01K 1/024 (2021.01)
A23B 4/052 (2006.01)
G01K 13/00 (2021.01)

(52) U.S. Cl.
CPC ........... *A47J 37/0786* (2013.01); *A23B 4/052* (2013.01); *A47J 37/0704* (2013.01); *G01K 1/024* (2013.01); *G01K 13/00* (2013.01); *A47J 2202/00* (2013.01)

(58) Field of Classification Search
None
See application file for complete search history.

(56) References Cited

U.S. PATENT DOCUMENTS 10,218,833 B2  2/2019  Colston
10,258,195 B2  4/2019  Blomberg

*Primary Examiner* — Jason Lau
(74) *Attorney, Agent, or Firm* — Sanchelima & Associates, P.A.; Christian Sanchelima; Jesus Sanchelima

(57) ABSTRACT

A thermometer device including a shaft assembly, a heat fin assembly, and an electronic transceiver assembly is disclosed herein. The thermometer device includes a stainless-steel shaft body with a pointed distal end having temperature sensing elements housed in the body. The thermometer device further includes a T-shaped heat sink extending from the shaft portion near the proximal end. The proximal end of the body is mounted to an electronic transceiver module capable of wirelessly communicating the sensed temperature to an electronic mobile device. The electronic transceiver module includes a digital display for displaying the presently sensed temperature.

12 Claims, 3 Drawing Sheets

THERMOMETER DEVICE FOR A SMOKER

BACKGROUND OF THE INVENTION

1. Field of the Invention

The present invention relates to a thermometer device and, more particularly, to a thermometer device for a smoker that is wirelessly enabled and allows a user to monitor the temperature of food within the smoker through a mobile device.

2. Description of the Related Art

Several designs for a thermometer device have been designed in the past. None of them, however, include a thermometer device comprising a stainless-steel shaft body with a pointed distal end having temperature sensing elements housed in the body. The thermometer device further includes a T-shaped heat sink extending from the shaft portion near the proximal end. The proximal end of the body is mounted to an electronic transceiver module capable of wirelessly communicating the sensed temperature to an electronic mobile device. The electronic transceiver module includes a digital display for displaying the presently sensed temperature. It is known that individuals often are preoccupied with other matters while they are smoking food in a smoker. It is also known that keeping track of the individual temperatures of specific food within a smoker may be a difficult task. Furthermore, with traditional thermometers it is required that a user approach the heat of the smoker closely in order to read the temperature of the food therein. Such an approach could prove dangerous for a user when the smoker is at a high temperature. Therefore, there is a need for a wirelessly enabled thermometer device that allows a user to read the temperature of the thermometer on their mobile phone. Furthermore, the thermometer includes a heat fin to aid in properly dispensing the heat of the thermometer device to keep the electronics therein in an operating condition.

Applicant believes that a related reference corresponds to U.S. Pat. No. 10,218,833 issued for an electronic outdoor grilling appliance with a system for connection to a mobile device that is capable of controlling the setting for the appliance. Applicant believes another reference relates to U.S. Pat. No. 10,258,195 issued for a barbeque grill apparatus with a means of controlling the internal temperature using a smartphone However, these references differ from the present invention because they fail to present a thermometer device comprising a stainless-steel shaft body with a pointed distal end having temperature sensing elements housed in the body. The thermometer device further includes a T-shaped heat sink extending from the shaft portion near the proximal end. The proximal end of the body is mounted to an electronic transceiver module capable of wirelessly communicating the sensed temperature to an electronic mobile device. The electronic transceiver module includes a digital display for displaying the presently sensed temperature. The present invention addresses all these issues by providing a thermometer device with all of these elements included.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a safe and easy to use thermometer device for a smoker that allows a user to observe the temperature within a smoker from a mobile device.

It is another object of this invention to provide a thermometer device that is wirelessly enabled with a mobile device, wherein the mobile device displays the temperature of a smoker where the mobile device is mounted on.

It is still another object of the present invention to provide a thermometer device that connects to a mobile device, wherein the mobile device notifies the user once a desired temperature is reached.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
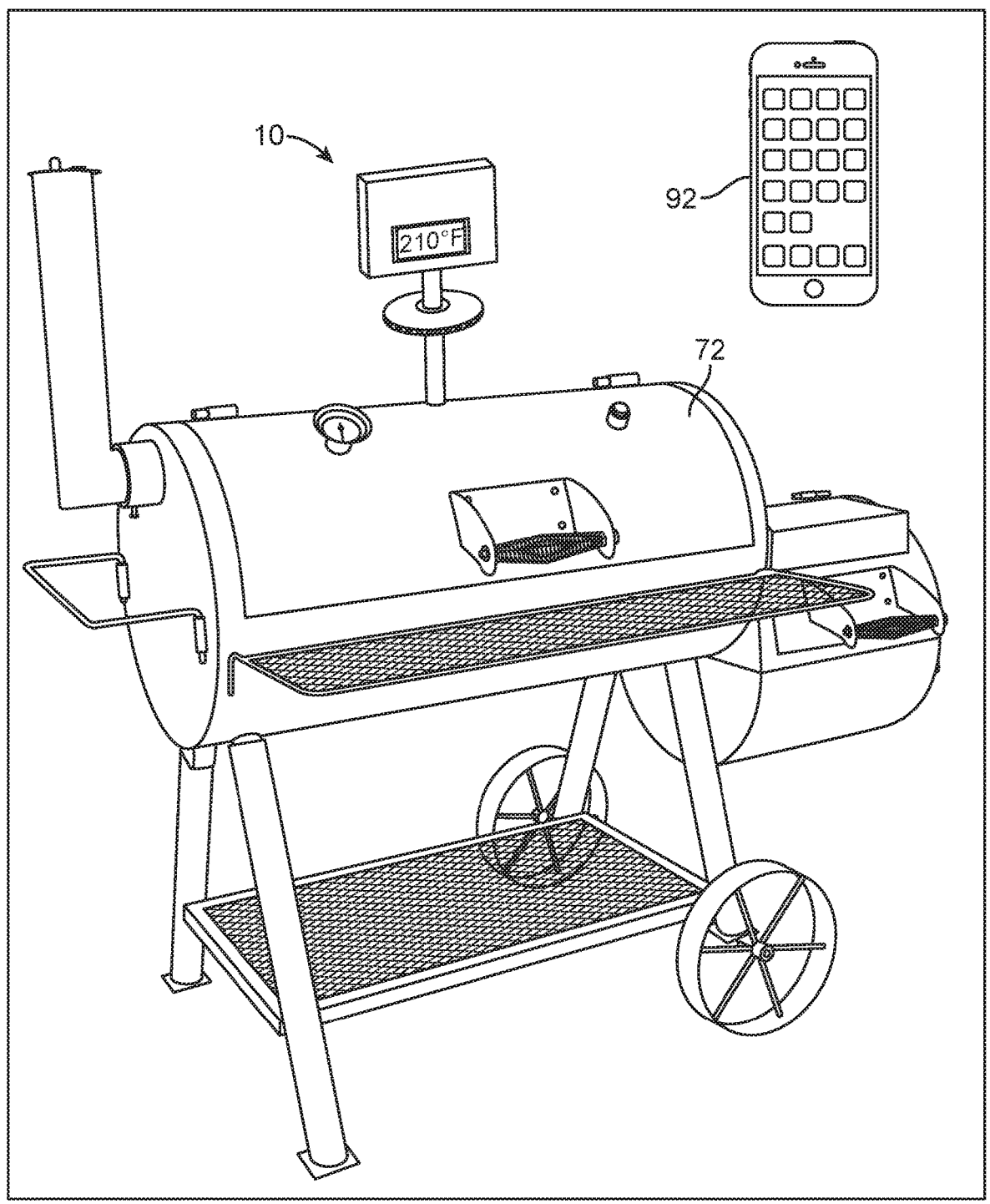
FIG. 1 represents an isometric view of thermometer device 10 in its operating environment connected to a smoker 72 mobile device 92 in accordance to an embodiment of the present invention.
Figure 2:
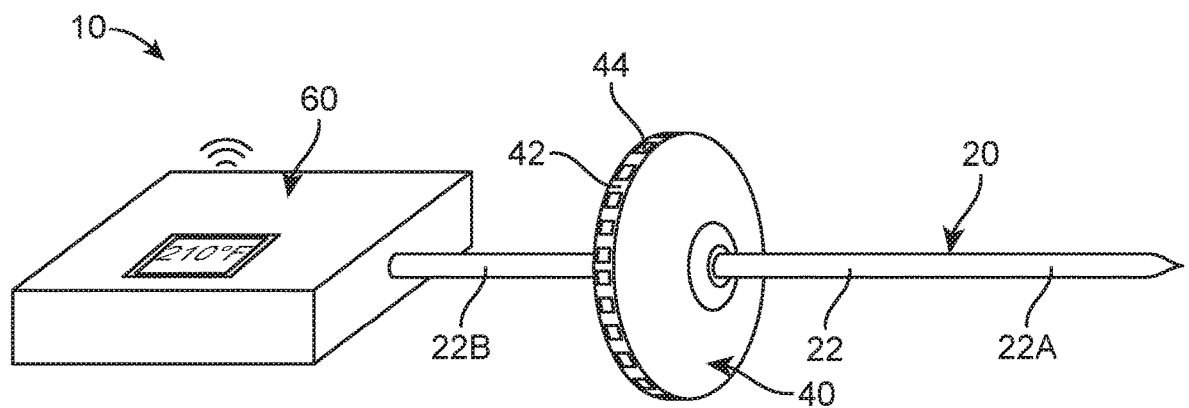
FIG. 2 shows an isometric view of thermometer device 10 in accordance to an embodiment of the present invention.
Figure 3:
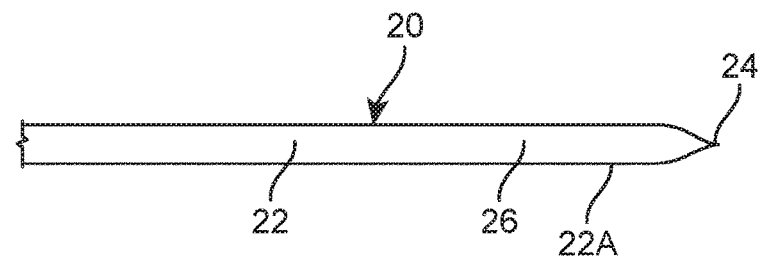
FIG. 3 illustrates an enlarged view of shaft assembly 20 in accordance to an embodiment of the present invention.
Figure 4:
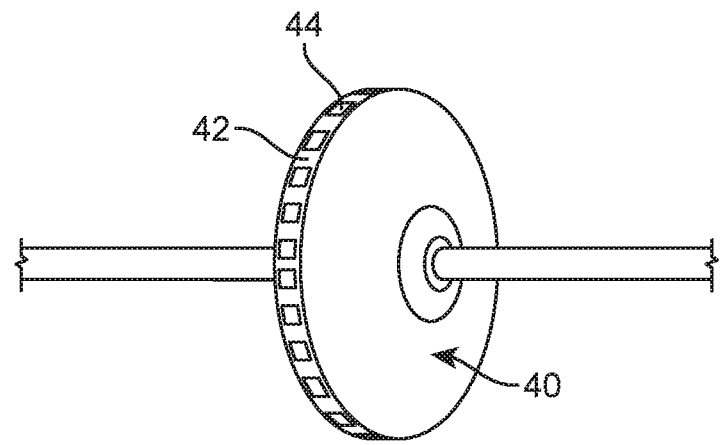
FIG. 4 is a representation of an enlarged view of heat sink fin assembly 40 in accordance to an embodiment of the present invention.
Figure 5:
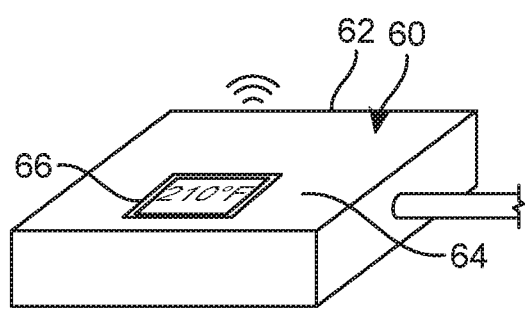
FIG. 5 shows an enlarged view of electronic transceiver assembly 60 in accordance to an embodiment of the present invention.

Referring now to the drawings, where the present invention is generally referred to with numeral 10, it can be observed a thermometer device 10 including a shaft assembly 20, a heat sink fin assembly 40, an electronic transceiver assembly 60, a smoker 72, and a mobile device 92.

Shaft assembly 20 includes a shaft body 22 having a first end 22A and a second end 22B. In one embodiment, shaft body 22 is a cylindrical elongated rod made of a stainless-steel material. It should be understood that additional embodiments may include additional shaft bodies made of different suitable hear resistant materials. Shaft assembly 22 may further include a pointed end 24 located at first end 22A of shaft body 22. In one embodiment, pointed end 24 is a conically pointed piece of metal integrally mounted to first end 22A of shaft body 22. Additionally, the pointed nature of pointed end 24 allows a user to suitable puncture food to then accurately check the internal temperature therein. The stainless-steel nature of shaft body 22 allows it to be safe and suitable for contact with any food that thermometer device 10 may come in contact with. Shaft assembly 20 may further include temperature sensing elements 26 housed therein shaft body 22. In one embodiment, temperature sensing elements 26 are located near first end 22A of shaft body 22. Temperature sensing elements 26 are provided as hardware material within shaft body 22. Furthermore, temperature sensing elements 26 are configured to sense the temperature of a surrounding area of shaft body 22. In one embodiment, shaft assembly 20 is placed within a smoker 72 to aid a user in determining the appropriate temperature therein. An opening may be provided on a cover of smoker 72 wherein a user may then insert first end 22A of shaft assembly 22 to then puncture food that is resting within smoker 72.

Heat sink fin assembly 40 includes a fin 42 mounted thereon shaft assembly 20. In the present embodiment, fin 42 is a suitable heat dispensing fin with the proper configuration to disperse heat on shaft assembly 20. Fin 42 may be made of the same stainless-steel material as shaft assembly 42. It should be understood, that any suitable heat dispensing material may be used with fin 42. In one embodiment, heat dispensing fin is located near second end 22B of shaft body 22. Furthermore, fin 42 may be an annular fin with a hyperbolic profile extending around an entire circumference of shaft body 22 in an embodiment of the present invention. It should be understood that additional embodiments may include fin 42 of other suitable heat sink fin configurations and is not limited to being that of an annular hyperbolic form. Furthermore, fin 42 may extend along a predetermined amount of length along shaft body 22. Additionally, fin 42 may extend outwardly from shaft body 22 a predetermined amount. Fin 42 is configured to dissipate heat that is encountered on shaft body 22 when thermometer device 10 is in its operating environment. Fin 42 may further include a plurality of cut portions 44 surrounding a circumference of fin 42. Plurality of cut portions 44 may be provided as rectangular cut portions along the edge of fin 42. Fin 42 allows a user to safely operate thermometer device 10 from second end 22B. Fin 42 dissipates a suitable amount of heat such that a user may freely grasp second end 42 without fear of being burned. Additionally, fin 42 dissipates a suitable amount of heat to protect electrical components found therein thermometer device 10 from overheating.

Electronic transceiver assembly 60 includes a housing 62. In one embodiment, housing 62 is of a cubic rectangular shape and made of a stainless-steel material. It should be understood, that additional embodiments of housing 62 may include additional shapes and materials configured for safe use in a high temperature environment. Additionally, housing 62 stores a electronic transceiver module 64 therein. Electronic transceiver module 64 is provided as hardware found therein housing 62. In one embodiment, housing 62 is integrally mounted to second end 22B of shaft body 22. Furthermore, electronic transceiver module 64 is communicably attached to temperature sensing elements 26 therein shaft body 22. Electronic transceiver module 64 is configured to process and read the information gathered by temperature sensing elements 26. Electronic transceiver module 64 may further include a display unit 66. In one embodiment, display unit 66 may be a rectangular LED screen mounted thereon housing 62. Furthermore, display unit 66 may be configured to display the temperature processed by electronic transceiver module 64. Electronic transceiver module 64 may be further enabled to wirelessly connect to mobile device 92. In one embodiment, electronic transceiver module 64 communicates to mobile device 92 through WIFI communication. Additionally, mobile device 92 may be provided as cellular device. In one embodiment, mobile device 92 is configured to display the temperature that is read by electronic transceiver module 64. Additionally, a phone application may be provided for mobile device 92 wherein a user may view the current temperature. Furthermore, the phone application may further be configured such that is may alert a user when a certain temperature is read by electronic transceiver module 64. These temperatures may relate to the necessary temperature needed to cook a particular food within smoker 72 This food may be chicken, steak, or any other suitable food that may be inserted within smoker 72. In one embodiment, electronic transceiver module 64 may further include a timer. The timer is configured to notify the user once a predetermined amount of time has passed by within a certain temperature range. This will remind a user to check in on the food that is being cooked within smoker 72. Additionally, a user may be notified of the timer through an audible beep or vibration and the like. In one embodiment, electronic transceiver module sends a notification to a user's mobile device 92 to notify them that the timer has been activated and when a predetermined amount of time has passed by.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a thermometer device, comprising:
   a. a mobile device;
   b. a shaft assembly, including a shaft body having a first end and a second end, wherein said shaft body is a cylindrical elongated rod made of a stainless steel material, wherein said shaft body includes a pointed end located at said first end of said shaft body, wherein said pointed end is a conically shaped pointed end, wherein said shaft body further includes temperature sensing elements housed therein said shaft body, wherein said temperature sensing elements are configured to sense the temperature of a surrounding area of said shaft body;
   c. a heat sink fin assembly, including a fin located near said second end of said shaft body, wherein said fin is an annular fin, wherein said fin extends along a predetermined amount of length along said shaft body, wherein said fin is configured to dissipate heat of said thermometer to allow for safe use be a user;
   d. an electronic transceiver assembly, including a housing being cubic rectangular in shape, wherein said housing stores an electronic transceiver module therein, wherein said electronic transceiver module is capable of wirelessly communicating the sensed temperature to said mobile device, wherein said electronic transceiver module is located on a second end of said shaft body.

2. The system for a thermometer device of claim 1 wherein said heat fin further includes a plurality of cut portions surrounding a circumference of said fin.

3. The system for a thermometer device of claim 2 wherein said plurality of cut portions have a rectangular shape.

4. The system for a thermometer device of claim 1 wherein said fin extends outwardly from said shaft body a predetermined amount.

5. The system for a thermometer device of claim 1 wherein said housing is integrally mounted to said second end of said shaft body.

6. The system for a thermometer device of claim 1 wherein said wireless transceiver module is communicably attached to said temperature sensing elements.

7. The system for a thermometer device of claim 1 wherein said electronic transceiver module further includes a display unit rectangular in shape, configured to display the current temperature sensed by said shaft body.

8. The system for a thermometer device of claim 1 wherein said display unit is an LED screen.

9. The system for a thermometer device of claim 1 wherein said electronic transceiver module communicates to said mobile phone through WIFI communication.

10. The system for a thermometer device of claim 1 wherein said shaft assembly is inserted into a smoker.

11. The system for a thermometer device of claim 1 wherein said electronic transceiver module further includes a timer to notify a user when a predetermined amount of time has lapsed.

12. A system for a thermometer device, comprising:
a. a mobile device, wherein said mobile device is a phone;
b. a smoker apparatus, including a cover;
c. a shaft assembly, including a shaft body having a first end and a second end, wherein said shaft body is a cylindrical elongated rod made of a stainless steel material, wherein said shaft body includes a pointed end located at said first end of said shaft body, wherein said pointed end is a conically shaped pointed end, wherein said shaft body further includes temperature sensing elements housed therein said shaft body, wherein said temperature sensing elements is configured to sense the temperature of the surrounding area of said shaft body, wherein said first end of said shaft body is inserted within an opening located on said cover;
d. a heat sink fin assembly, including a fin mounted near said second end of said shaft body, wherein said fin is an annular fin, wherein said fin extends along a predetermined amount of length along said shaft body, wherein said fin is configured to dissipate heat of said thermometer to allow for safe use be a user, wherein said fin extends outwardly from said shaft body a predetermined amount, wherein said heat fin further includes a plurality of cut portions surrounding the circumference of said fin, wherein said plurality of cut portions have a rectangular shape; and
e. a electronic transceiver assembly, including a housing being cubic rectangular in shape, wherein said housing stores an electronic transceiver module therein, wherein said electronic transceiver module is capable of wirelessly communicating the sensed temperature to said mobile device, wherein said electronic transceiver module is located on a second end of said shaft body, wherein said electronic transceiver module is integrally mounted to said second end of said shaft body, wherein said electronic transceiver module further includes a display unit rectangular in shape, configured to display the current temperature sensed by said shaft body, wherein said electronic transceiver module communicates to said mobile phone through WIFI communication.

* * * * *